Figure 1:
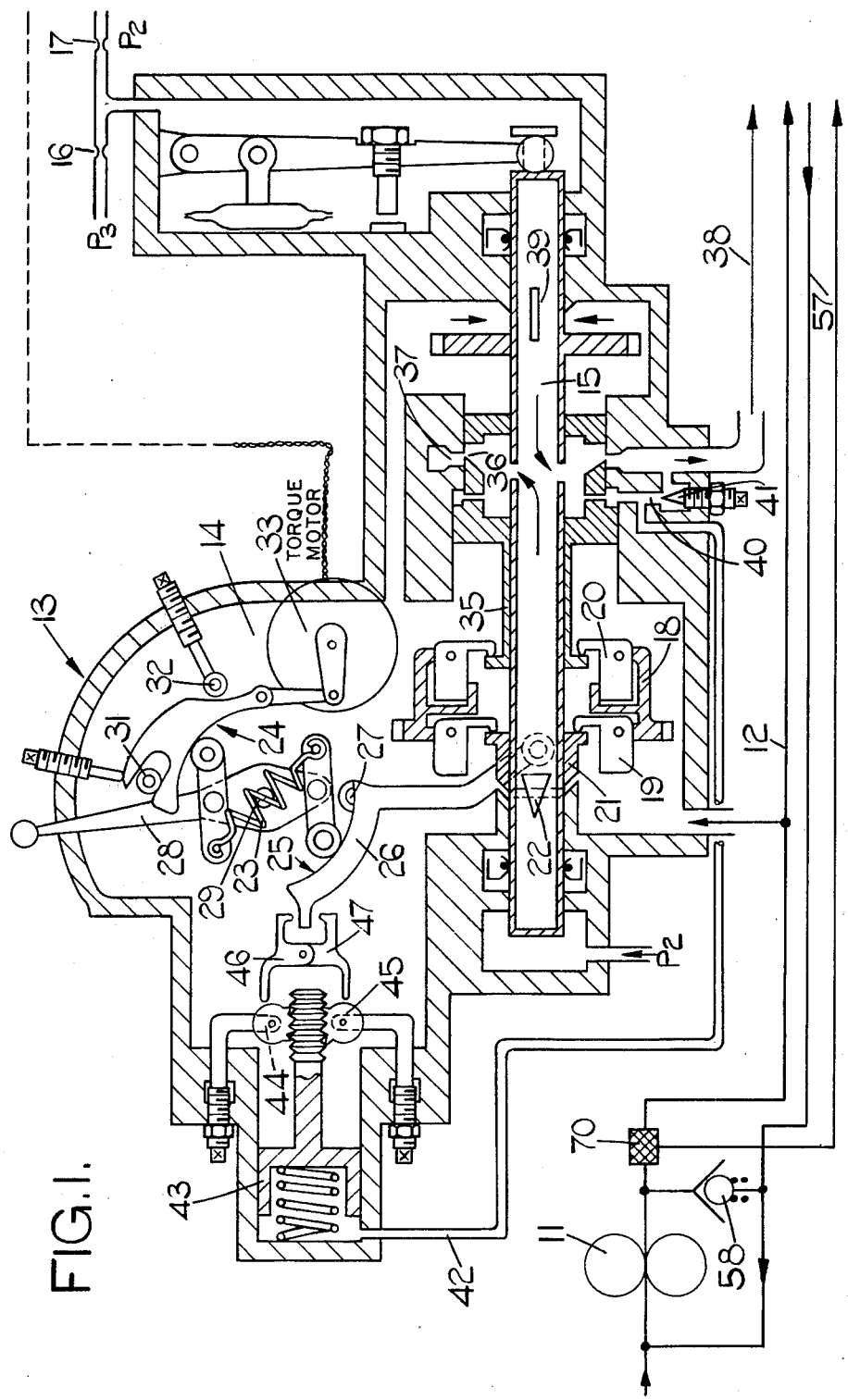

United States Patent [19]  
Smith

[11] 4,019,318  
[45] Apr. 26, 1977

[54] FLUID FLOW CONTROL VALVES

[75] Inventor: Trevor Stanley Smith, Sutton Coldfield, England

[73] Assignee: Lucas Industries Limited, Birmingham, England

[22] Filed: Jan. 16, 1976

[21] Appl. No.: 649,617

[30] Foreign Application Priority Data

Feb. 5, 1975 United Kingdom ............... 4830/75

[52] U.S. Cl. ...................... 60/39.28 R; 137/489.5; 137/597
[51] Int. Cl.² ......................................... F02C 9/08
[58] Field of Search .............. 60/39.28 R; 137/487, 137/490, 489.5, 597

[56] References Cited
UNITED STATES PATENTS

| | | | |
|---|---|---|---|
| 3,021,674 | 2/1962 | Zeisloft | 60/39.28 R |
| 3,123,128 | 3/1964 | Zeisloft | 60/39.28 R |
| 3,514,947 | 6/1970 | Bloom | 60/39.28 R |
| 3,530,666 | 9/1970 | Cross | 60/39.28 R |
| 3,630,029 | 12/1971 | Smith | 60/39.28 R |
| 3,958,414 | 5/1976 | Smith | 60/39.28 R |

*Primary Examiner*—Clarence R. Gordon
*Attorney, Agent, or Firm*—Ladas, Parry, Von Gehr, Goldsmith & Deschamps

[57] ABSTRACT

A fluid flow control valve has two inlets and two outlets. A control element is movable to simultaneously vary flow from the first and second inlet to the first outlet, and from the second inlet to the second outlet. The control element is responsive to the pressure at the first inlet and to a pressure intermediate the second inlet and first outlet. The arrangement is such that the flow from the second inlet to the first outlet is a predetermined multiple of the flow through the first inlet, and that excess fluid entering the second inlet is spilled through the second outlet.

8 Claims, 2 Drawing Figures

FLUID FLOW CONTROL VALVES

This invention relates to fluid flow control valves.

According to the invention a fluid flow control valve comprises a body having first and second inlets and first and second outlets, a control element movable within said body in response to variations in a servo pressure signal and combining with ports in said body to provide a first variable flow restrictor between said first inlet and said first outlet, second and third variable flow restrictors in series between said second inlet and said first outlet, and a fourth variable flow restrictor between said second inlet and said second outlet, and a pilot valve, responsive to a difference between the pressure at said first inlet and the pressure intermediate said second and third restrictors, for varying said servo pressure signal, an increase in the pressure at said first inlet resulting in an increase in flow through said first, second and third restrictors and a simultaneous decrease in flow through said fourth restrictor.

According to another aspect of the invention a fuel control system for a gas turbine engine comprises a pump, a control valve as above defined, through said first outlet of which fuel can flow to the engine, a variable metering device responsive to engine operating parameters and connected between the outlet of said pump and said first inlet, said second inlet being connected to receive unmetered fuel from said pump outlet and said second outlet being connected to a low pressure zone.

Figure 2:
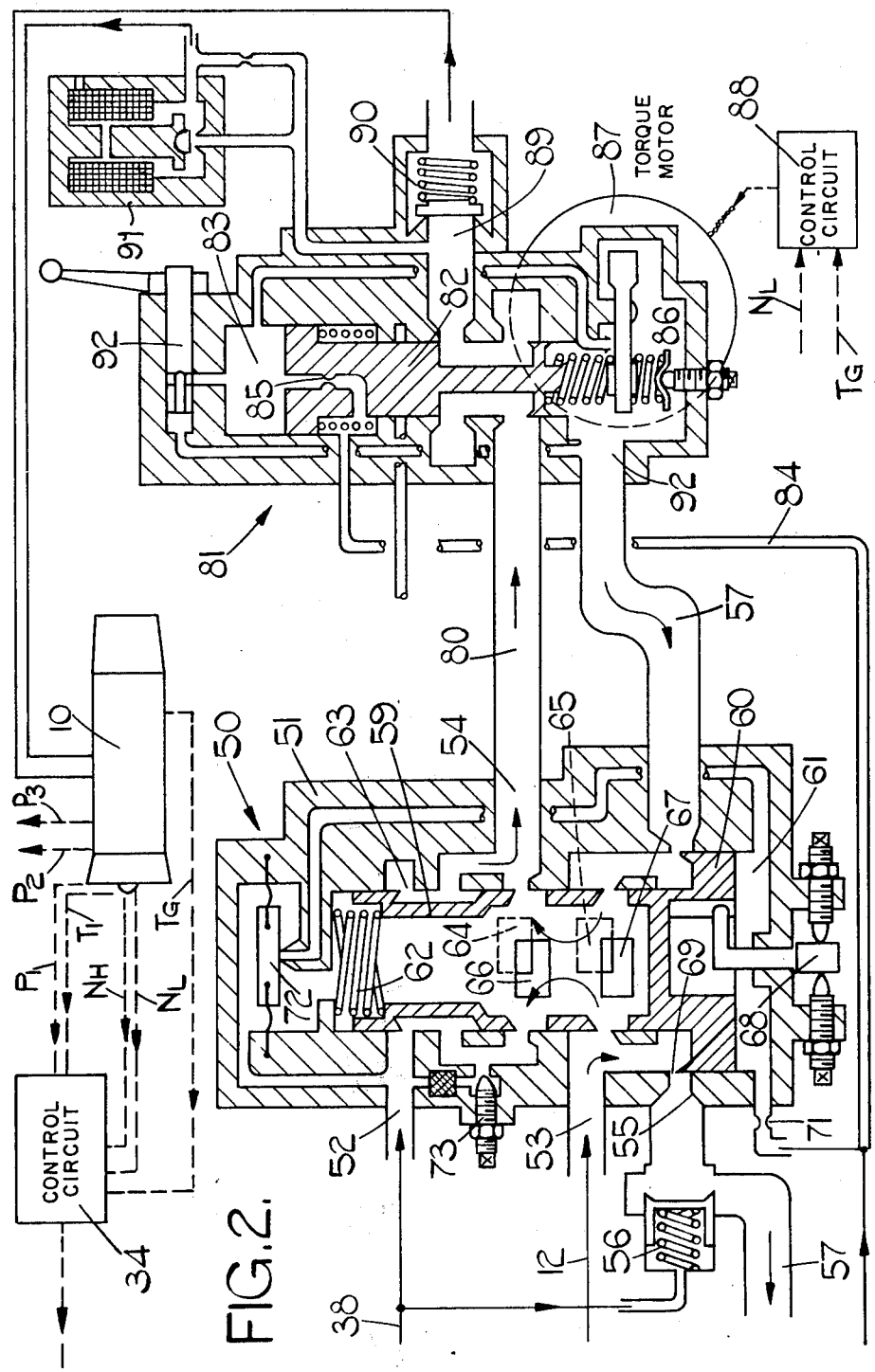

An example of the invention will now be described with reference to the accompanying drawings in which FIGS. 1 and 2 show different parts of a single fuel control system and which should be read in conjunction.

A fuel control system for a twin-spool gas turbine engine 10 includes a positive displacement pump 11 which can be driven by the engine 10 to deliver fuel to a line 12. A variable metering device 13 includes a chamber 14 which communicates with the line 12. A hollow stem 15 is mounted for rotation within the chamber 14 by a shaft of the engine 10. Stem 15 is also axially slidable within chamber 14 and is urged leftwards, as shown in FIG. 1, by an increase in a pressure $P_{3P}$ intermediate a pair of flow restrictors 16, 17 connected in series between a presssure $P_3$ at the engine compressor outlet and a pressure $P_2$ at an intermediate stage of the engine compressor. Stem 15 is urged to the right by an increase in pressure $P_2$.

Also mounted within chamber 14 for rotation by a shaft of the engine 10 is a carrier 18 supporting first and second groups 19, 20 of governor weights. Governor weights 19 engage a sleeve 21 slidable on the stem 15 and co-operating with at least one triangular port 22 in the stem 15 to define a variable metering orifice, the arrangement being such that movement of stem 15 to the left or of sleeve 21 to the right permits increased fuel flow from chamber 14 to the inside of stem 15.

Sleeve 21 is biased against the action of flyweights 19 by a tension spring 23 which acts between a pair of cam surfaces 24, 25. Cam surface 25 is on one end of a lever 26 which is mounted for pivotal movement about an axis 27 and whose other end engages the sleeve 21. The bias applied by lever 26 to sleeve 21 is thus dependent on the point of application of the force of spring 23 to lever 26 and on the configurations and relative postions of the cam surfaces 24, 25. Spring 23 is mounted on a carrier 28 pivotally movable about an axis 29 to vary the positions of application of the force of spring 23 to cam surfaces 24, 25. The position of cam surface 24 relative to cam surface 25 is variable by means of a pair of adjustable rollers 31, 32 and also by a torque motor 33 responsive to electrical signals from a control circuit 34. Motor 33 and circuit 34 provide trimming adjustments for cam surface 24 in accordance with a plurality of engine operating parameters, as for example, compressor inlet pressure $P_1$, compressor inlet temperature $T_1$, the speeds $N_H$ and $N_L$ of the high and low speed engine shafts respectively and the combustion temperature $T_G$.

Governor weights 20 engage a further sleeve 35 surrounding the stem 15. Sleeve 35 has a double-area piston portion responsive to the pressure drop across the metering orifice defined by the ports 22. Sleeve 35 has ports 36 which cooperate with ports 37 in a wall of chamber 14 to define a pressure drop control valve in series with the variable metering orifice. The arrangement is such that an increase in the metering orifice pressure drop or a decrease in the engine speed tends to shut the throttle valve, the effect being that the pressure drop across the variable metering orifice is maintained substantially constant for a given engine speed. Ports 37 provide an outlet for the variable metering device 13 and communicate with a fuel delivery line 38.

The stem 15 has a rectangular port 39 which combines with an edge of the wall of chamber 14 to provide a further metering orifice in parallel with that provided by the ports 22. The orifice provided by port 39 is responsive only to variations in the pressures $P_2$ and $P_{3P}$.

In parallel with the pressure drop control valve provided by ports 36, 37 is a passage 40 which communicates with the line 38 via an adjustable flow restrictor 41. Flow through passage 40 can provide a fuel supply for lighting-up the engine, even though the engine speed and/or the main metering orifice pressure drop are such as to keep port 37 shut.

The pressure within stem 15 is applied via a passage 42 to one side of a piston 43 whose other side is subjected to the delivery pressure of pump 11. Piston 43 is therefore responsive to the pressure drop across the variable metering orifice and is movable to rotate cams 44, 45 which act through levers 46, 47 to restrict movement of lever 26 in either direction.

A control valve 50 (FIG. 2) has a body 51 provided with a first inlet 52 and a second inlet 53. Inlet 52 communicates with fuel delivery line 38 and inlet 53 communicates with the outlet of pump 11 via line 12. Body 51 has a first outlet 54 through which fuel can flow to the engine 10 and a second outlet 55 through which fuel can flow, via a pressure-responsive valve 56 and a low pressure return line 57 to the upstream side of pump 11. Lines 12 and 57 are interconnected via a spring-loaded relief valve 58 (FIG. 1). Valve 56 is spring-loaded towards a shut position and is responsive to the pressures in line 38 and outlet 55, the arrangement being such that during the conditions operating at engine light-up valve 56 prevents any substantial return of fuel via line 57.

Valve 50 includes a control element 59 which is slidable in a bore in the body and which has a piston portion 60 responsive to an increase in a servo pressure signal in a chamber 61 to urge control element 59 against a spring 62.

Control element 59 combines with the body 51 to define a first variable flow restrictor 63 between the first inlet 52 and the first outlet 54. Opening into the bore in the body 51 is a plurality of square ports 64 which communicate with the first outlet 54, and a plurality of square ports 65 which communicate with the second inlet 53. Control element 59 has a hollow portion into which a plurality of square ports 66 and a further plurality of square ports 67 open. Ports 64, 66 combine to define a second variable flow restrictor, and ports 65, 67 combine to define a third variable flow restrictor, the second and third variable flow restrictors being in series between inlet 53 and outlet 54.

Axial movement of control element 59 within the bore varies the alignment of ports 66, 67 with the respective ports 64, 65. Element 59 is also rotationally adjustable by means of a crank 68, this rotational adjustment also serving to vary the alignment of the foregoing respective ports. The arrangement is such that flow through the second and third restrictors is a product of the rotational and axial positions of control element 59.

Element 59 also combines with outlet 55 to define a fourth variable flow restrictor 69 between inlet 53 and outlet 55.

The servo pressure in chamber 61 is derived from the outlet of pump 11 via a filter 70 (FIG. 1), a restrictor 71 and a pilot valve 72 which comprises a diaphragm which co-operates with a nozzle outlet. The diaphragm of valve 72 is responsive to an increase in the pressure at inlet 52 to move towards the nozzle outlet and thereby to increase the servo pressure signal in chamber 61. Valve 72 is also responsive to the pressure intermediate ports 66, 67, that is to the pressure immediately upstream of the second variable flow restrictor 64, 66, an increase in this latter pressure acting to reduce the servo pressure signal. It is desirable that graphs of the areas of the first 63 and second 64, 66 flow restrictors, when plotted against movement of the element 59, both pass through the origin. Since this is difficult to achieve practically, the characteristic of the first restrictor 63 is adjustable by a variable restrictor 73 in parallel with restrictor 63.

In use, pilot valve 72 is responsive to the pressures upstream of the first variable flow restrictor 63 and upstream of the second variable flow restrictor (ports 64, 66) to maintain these pressures equal, the downstream pressure of the first and second variable flow restrictors being that in outlet 54. An increase in the pressure in inlet 52 causes an increase in the servo pressure signal in chamber 61, moving element 59 upwardly as seen in the drawing, increasing flow through the first restrictor 63 the second resistor (ports 64, 66) and the third restrictor (ports 65, 67). Spill flow through the fourth variable flow restrictor 69 is reduced. The pressure in inlet 52 tends to fall and that upstream of the port 66 tends to rise.

The pressure drop across the first and second variable flow restrictors are thus maintained equal, whereby the proportion of fluid flowing through these restrictors is dependent only on the relative areas thereof, it may therefore be arranged that flow through the second flow restrictor (ports 64, 66) is a predetermined multiple of the flow through the first restrictor 63.

Such an arrangement has the effect that the variable metering device 13 need not be sufficiently large to cope with the full fuel flow to the engine, but only with a predetermined fraction thereof.

The outlet 54 of valve 50 communicates with the engine 10 via a passage 80 and a servo-operated throttled valve 81. Valve 81 has a control element 82 responsive to the servo pressure in a chamber 83 and derived from the filter 70 via a line 84, a restrictor 85 and a pilot valve 86 operated by a torque motor 87. Motor 87 is responsive to signals from a control circuit 88 dependent on the speed $N_L$ of the engine low speed shaft and on the combustion temperature $T_C$. The outlet 89 of valve 81 communicates with the main engine burners via a pressurising valve 90 and with the engine pilot burners via a solenoid operated valve 91. A further outlet 92 of valve 81 communicates with the upstream side of pump 11 via passage 57. Control element 82 is movable in response to operation of the torque motor 87 to control flow to the engine, control circuit 88 being responsive to an unacceptably high level of speed $N_L$ to reduce this fuel flow.

Fuel escaping past pilot valve 86 is returned to the upstream side of pump 11 via passage 57. A manually operable pilot valve 92 can be used to connect chamber 83 directly to passage 57, thereby causing control element 82 to shut off outlet 89 and to connect passage 80 directly to passage 57, spilling all the fuel upstream of valve 81 back to the pump inlet. Valve 81 thus operates not only as an overspeed control valve but as a combined shut-off and spill valve.

I claim:
1. A fluid flow control valve comprising a body having first and second inlets and first and second outlets, a control element movable within said body in response to variations in a servo pressure signal and combining with ports in said body to provide a first variable flow restrictor between said first inlet and said first outlet, second and third variable flow restrictors in series between said second inlet and said first outlet, and a fourth variable flow restrictor between said second inlet and said second outlet, and a pilot valve, responsive to a difference between the pressure at said first inlet and the pressure intermediate said second and third restrictors, for varying said servo pressure signal, an increase in the pressure at said first inlet resulting in an increase in flow through said first, second and third restrictors and a simultaneous decrease in flow through said fourth restrictor.

2. A valve as claimed in claim 1 in which said body includes first and second ports opening into said bore and respectively communicating with said first and second inlets, and in which said control element is slidable within said bore and cooperates with said first and second ports to define said second and third flow restrictors respectively.

3. A valve as claimed in claim 2 in which said control element includes a hollow portion into which third and fourth ports open, said third and fourth ports cooperating respectively with said first and second ports to define said second and third flow restrictors respectively.

4. A valve as claimed in claim 1 which includes means for rotating said control element within said body, to vary the effective flow areas of said second and third flow restrictors.

5. A valve as claimed in claim 1 in which said pilot valve comprises a diaphragm and a nozzle outlet, said diaphragm being movable towards and away from said nozzle outlet in response to variations in the pressure at said first inlet or the pressure intermediate said second and third restrictors.

6. A valve as claimed in claim 1 which includes a further, adjustable restrictor in parallel with said first variable restrictor.

7. A fuel control system for a gas turbine engine, comprising a pump a control valve as claimed in claim 1, through said first outlet of which fuel can flow to the engine, a variable metering device responsive to engine operating parameters and connected between the outlet of said pump and said first inlet, said second inlet being connected to receive unmetered fuel from said pump outlet, and said second outlet being connected to a low pressure zone.

8. A fuel control system as claimed in claim 7 which includes a throttle valve having an inlet communicating with said first outlet of the control valve, a main outlet for connection to burners of the engine, a spill outlet communicating with a low pressure zone a control element movable in response to variations in a signal pressure to simultaneously control communication between said throttle valve inlet and said main and spill outlet, and an electrically-operable pilot valve responsive to an operating parameter of the engine for varying said signal pressure.

* * * * *